United States Patent
Richman et al.

(10) Patent No.: US 11,153,640 B2
(45) Date of Patent: Oct. 19, 2021

(54) MEMORY MANAGEMENT OF REPLACEMENT CONTENT IN DIGITAL TV SYSTEM

(71) Applicant: Sony Corporation, Tokyo (JP)

(72) Inventors: Steven Richman, San Diego, CA (US); Tanmay Agnihotri, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/785,109

(22) Filed: Feb. 7, 2020

(65) Prior Publication Data
US 2021/0250645 A1  Aug. 12, 2021

(51) Int. Cl.
| | | |
|---|---|---|
| *H04N 21/44* | (2011.01) | |
| *H04N 21/81* | (2011.01) | |
| *H04N 21/438* | (2011.01) | |
| *H04N 21/443* | (2011.01) | |
| *H04N 21/435* | (2011.01) | |

(52) U.S. Cl.
CPC ..... *H04N 21/44016* (2013.01); *H04N 21/435* (2013.01); *H04N 21/4383* (2013.01); *H04N 21/4435* (2013.01); *H04N 21/812* (2013.01)

(58) Field of Classification Search
CPC ......... H04N 21/44016; H04N 21/4435; H04N 21/812; H04N 21/435; H04N 21/4383
See application file for complete search history.

(56) References Cited

U.S. PATENT DOCUMENTS

| 6,115,080 A   * | 9/2000  | Reitmeier | H04N 5/445 |
|---|---|---|---|
| 7,730,533 B1  * | 6/2010  | Sobel     | G06F 11/30 |
| 2002/0067718 A1 * | 6/2002  | Coupe     | H04L 12/28 |
| 2014/0365759 A1 * | 12/2014 | Wang      | H04L 63/168 |

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.
"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC Standard: ATSC 3.0 Interactive Content (A/344)", May 2, 2019.
"ATSC Standard: ATSC 3.0 Security and Service Protection", Aug. 20, 2019.

(Continued)

*Primary Examiner* — Anthony Bantamoi
(74) *Attorney, Agent, or Firm* — John L. Rogitz (57) ABSTRACT

Techniques are described for expanding and/or improving the Advanced Television Systems Committee (ATSC) 3.0 television protocol in robustly delivering the next generation broadcast television services. XLINKS are staged in successively faster memories of the receiver as ad insertion time approaches such that the entire segment can be viewed holistically and dynamically referenced, where all segment ads are available instantly when stored in SDRAM mode as compared to FLASH or coming from the Cloud. Each parsed item has its own timing to be synchronized with other DASH segment items for a single view experience.

19 Claims, 5 Drawing Sheets

(56) References Cited

OTHER PUBLICATIONS

"ATSC Standard: ATSC 3.0 System", Sep. 17, 2019.
"ATSC Standard: Signaling, Delivery, Synchronization, and Error Protection (A/331)", Jun. 19, 2019.
"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.
"RFC 5280, Internet X.509 Public Key Infrastructure Certificate and Certificate Revocation List (CRL) Profile," D. cooper, S. Santesson, S. Farrell, S. Boeyen, R. Housley, W. Polk, Internet Engineering Task Force, Fremont, CA, May 2008.
"RFC 5289, TLS Elliptic Curve Cipher Suites with SHA-256/384 and AES Galois Counter Mode (GCM)," E. Rescorla, Internet Engineering Task Force, Fremont, CA, Aug. 2008.
"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.
"RFC 5652, Cryptographic Message Syntax (CMS)," R. Housley, Internet Engineering Task Force, Fremont, CA, Sep. 2009.
"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Certificate Status Protocol (OCSP) Profile for High-Volume Environments," A. Deacon, R. Hurst, Internet Engineering Task Force, Fremont, CA, Sep. 2007.

* cited by examiner

MEMORY MANAGEMENT OF REPLACEMENT CONTENT IN DIGITAL TV SYSTEM

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, ATSC 3.0 includes metadata regarding, among other things, replacement content such as advertisements that can be inserted into an audio video stream, which may be received via broadcast and/or broadband. This metadata includes so-called extensible markup language (XML) linking language ("Xlinks"), which are pointers to network locations and in some cases presentation timing information of replacement content.

The metadata is acquired in broadcast data structures variously referred to as "manifest files" or "media presentation descriptions" (MPD) and may be in a protocol referred to as dynamic adaptive streaming over hypertext transfer protocol (HTTP) (DASH). The metadata also may be acquired from other than DASH manifest segments. As also understood herein, the metadata also can be acquired from multiple locations OTA and pushed down or from broadband connections or from the receiver itself, pre-stored and pre-cached.

Present principles recognize that the location of where metadata is cached in a receiver may be important. For example, available storages may include synchronous dynamic random access memory (SDRAM), RAM, and flash memory, and as understood herein which memory is used to store the metadata can depend on the length of time before its related replacement content is intended to be inserted into an audio video (AV) stream. This is complicated by the fact that content that is live can have a variable wait time, depending on what channel or channels (plural) are tuned to and the speed of access required. A next ad to be displayed, for example, may be required to be inserted in only a few seconds and thus require only a short time of storage, whereas for an ad segment that is later in the program the metadata/replacement content may require several minutes of storage. This is because with ATSC 3.0, the viewer is not only watching one linear program, one linear ad, or one linear overlay ad. Instead, multiple streams may be provided per DASH period, multiple ads may be provided per DASH period, multiple metadata structures may consequently be associated with each DASH period, and multiple segments for each live DASH stream can be provided if they are entirely different channels.

With the above in mind, techniques are described for storing metadata and more particularly Xlinks (and/or the actual replacements content to which they point) in memory of the receiver for insertion and then retrieving them when the content is close to being viewed live as part of a dynamic DASH workflow that is linked. The entire segment can be viewed holistically and dynamically referenced, and all segment ads are available instantly when stored in SDRAM mode as compared to FLASH or coming from the Cloud. Each parsed item has its own timing to be synchronized with other DASH segment items for a single view experience.

However, when content is coming from other sources OTA or OTT, complications with storage capacity can arise with storing all of the metadata in short term memory such as SDRAM. Tagging of content not within the segment and synchronized for playback may be difficult to align with live in-band content, and thus may be unusable for live experiences unless each memory link in SDRAM is also tagged and cross-referenced and accessed in real time. This may not be done for all cross-segmented but linked content but only content ready to be played back segment by segment. Each XLINK can be stored for proximity to the next TV event and priority tagging allowed to occur. Consequently, instead of loading up the entire RAM or SDRAM or other short-term memory with buffers, data in buffers can be staged in sequence from FLASH to RAM to SDRAM and to LIVE playout or rendering of content. Live tiles can have independent but connected/tagged XLINKS for Multiview timed content delivery into multiple windows/tiles on the single canvas.

Accordingly, a digital television system includes at least one receiver of digital television configured with instructions to receive from at least one transmitter assembly comprising at least one broadcast source and at least one broadband source at least one extensible markup language linking language (Xlink) associated with inserting into digital TV content at least a first advertisement. The instructions are executable to successively stage the Xlink in successively faster memories of the receiver as advertisement insertion time approaches.

In non-limiting examples, the instructions may be executable to initially store the Xlink in flash memory of the receiver and move the Xlink from flash memory to random access memory (RAM) of the receiver. The example instructions may be further executable to move the Xlink from the RAM to synchronous dynamic RAM (SDRAM) of the receiver. Further still, the instructions may be executable to move the Xlink from the SDRAM to a playout buffer of the receiver.

In example implementations the instructions can be executable to, for a first channel having a first length for a group of pictures (GOP), move the Xlink from a first memory of the receiver to a second memory of the receiver at a first time prior to an insertion time. The instructions may be executable to, for a second channel having a second length for a GOP, move the Xlink from the first memory of the receiver to the second memory of the receiver at a second time prior to an insertion time. The first GOP length can be longer than the second GOP length and the first time can be earlier from the insertion time than the second time.

If desired, the instructions may be executable to receive a channel change in a Multiview presentation, and responsive to the channel change, move the Xlink from a first memory of the receiver to a second memory. In other examples the instructions may be executable to, responsive to switching receiving content via broadcast to receiving content via broadband, move the Xlink from the first memory to a second memory.

In another aspect, a digital television system includes at least one receiver with at least one processor programmed with instructions to configure the processor to receive from at least one transmitter assembly at least a first service comprising at least one audio video (AV) stream. The instructions are executable to present the AV stream, receive a channel change command to tune to a second service, and retrieve from a broadcast or broadband source at least one replacement content and/or metadata associated therewith and associated with the second service. The instructions further are executable to store the replacement content and/or metadata associated therewith in a first storage of the receiver, and responsive to a first event, move the replacement content and/or metadata associated therewith from the first storage to a second storage of the receiver. The first event may include, for example, a Multiview event or a switch from receiving content via broadcast to receiving content via broadband.

In another aspect, in a digital television system, a method includes receiving from at least one transmitter assembly that includes at least one broadcast source and at least one broadband source at least one replacement content to be inserted into an audio video (AV) stream, and/or metadata associated therewith. The method also includes successively staging the replacement content to be inserted into the AV stream and/or metadata associated therewith in successively faster memories of the receiver as insertion time into the AV stream of the replacement content approaches.

The details of the present application, both as to its structure and operation, can best be understood in reference to the accompanying drawings, in which like reference numerals refer to like parts, and in which:

DETAILED DESCRIPTION

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Figure 1:
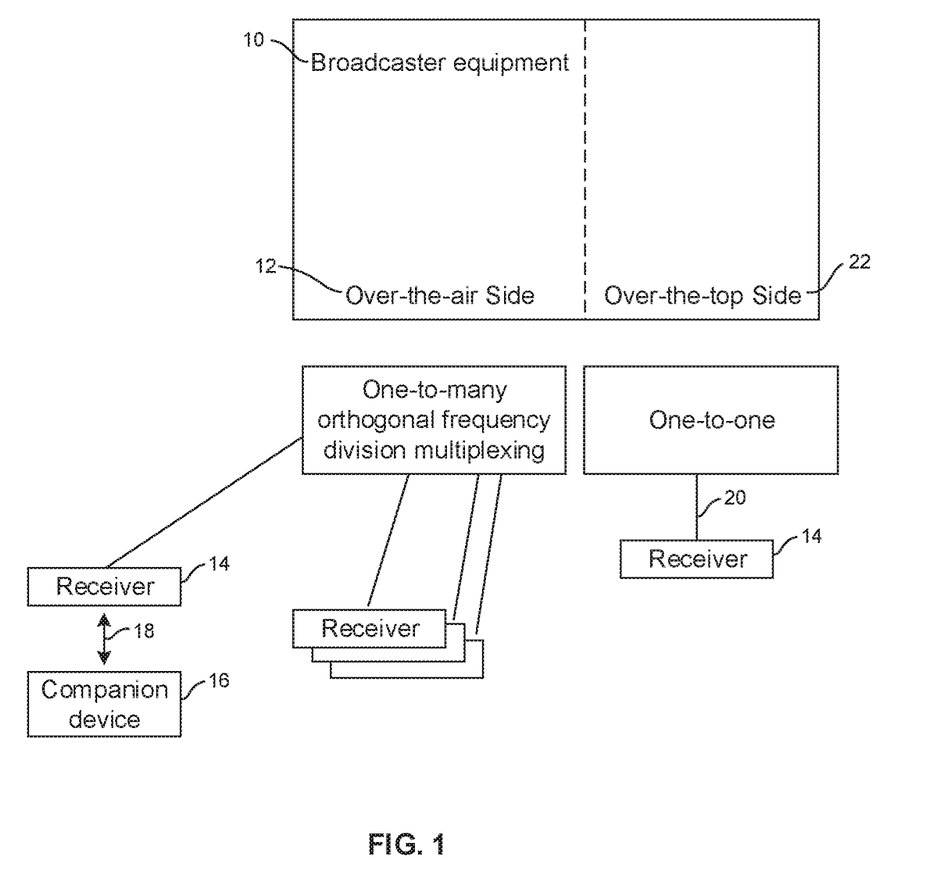
FIG. 1 is a block diagram of an Advanced Television Systems Committee (ATSC) 3.0 system.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
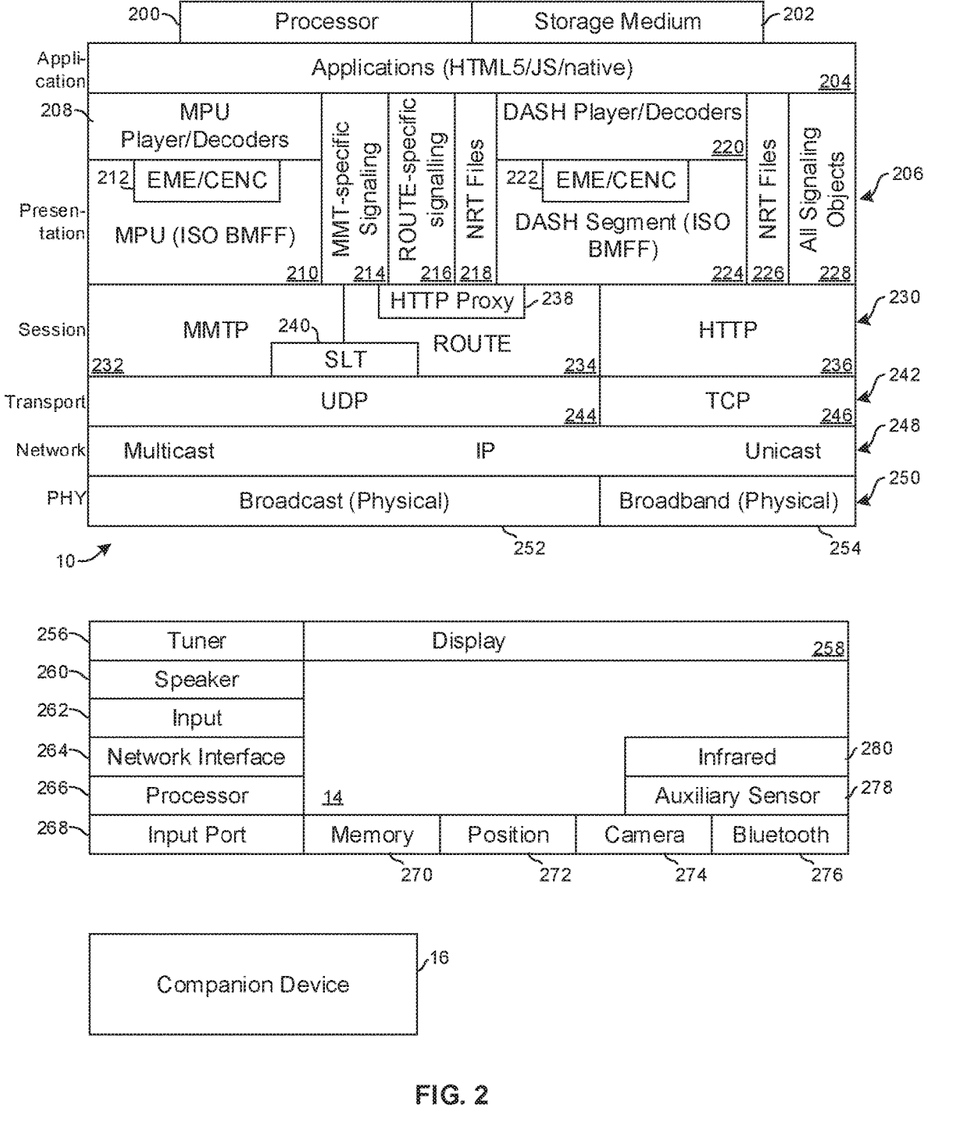
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zig-bee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
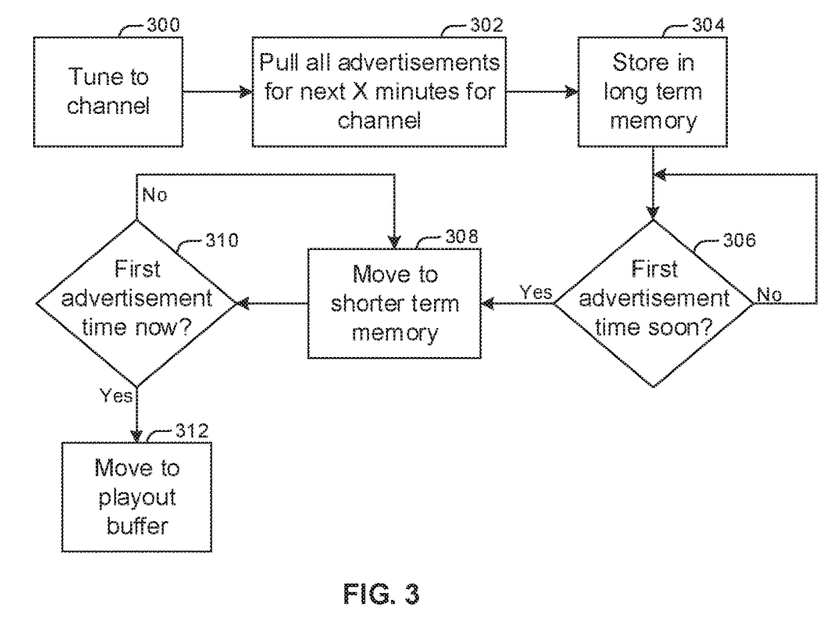
FIG. 3 is a flow chart illustrating example logic consistent with present principles.

Now referring to FIG. 3, a receiver is tuned to a particular broadcast channel at block 300. Moving to block 302, replacement content (an example of which is advertisements) and/or metadata related thereto (an example of which is Xlinks) is acquired for the upcoming "X" minutes of broadcast time on the channel. The acquisition may be accomplished by pulling, from a network site associated with the channel, the data sought. In some cases, the information (such as metadata) is acquired in a broadcast DASH MPD.

As indicated at block 304, the metadata and/or content to which is pertains may initially be stored in long term memory, i.e., in longer term memory than memory used for impending insertion of replacement content. In an example, the longer-term memory may be disk-based or flash memory. Each stored item of metadata (or associated content) includes a time at which the content is to be inserted and if desired one or more of an identification of the channel, DASH segment, and particular stream in the DASH segment into which the replacement content is to be inserted.

Decision diamond 306 is used to graphically indicate that when a particular piece of content is to be inserted a time of Y seconds in the future into the channel tuned to at block 300, it (or its metadata) may be moved from longer term memory to shorter term memory (such as RAM) at block 308. Decision diamond 310 is then used to graphically depict that when the time for insertion is even closer, say Z seconds in the future (wherein Z is less than Y), it (or its metadata) may be moved from the storage at block 308 to an even shorter term storage at block 312, such as a playout buffer. It is to be understood that when metadata is being moved through the storages until insertion time instead of the replacement content itself, the metadata is used to retrieve the replacement content from, e.g., a network address or from local storage at a time sufficient to acquire the content and insert it at the demanded time into the demanded stream.

Figure 4:
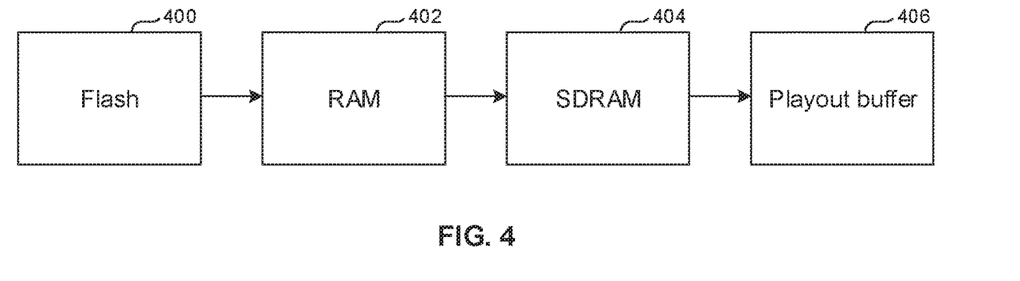
FIG. 4 is a block diagram of memory staging.

Thus, present principles recognize that the location of where metadata (and/or associated content) is cached in a receiver may be important. For example, as shown in FIG. 4 available storages may include (from longer-term to shortest term) flash memory 400, then RAM 402, then SDRAM 404, then a playout buffer 406. A next ad to be displayed, for example, may be required to be inserted in only a few seconds and thus require only a short time of storage (e.g., in SDRAM), whereas for an ad segment that is later in the program the metadata/replacement content may require several minutes of storage (in, e.g., flash). This enables an entire DASH segment to be viewed holistically and dynamically referenced, and all segment ads are available instantly when stored in SDRAM mode as compared to FLASH or coming from the Cloud. Each parsed item has its own timing to be synchronized with other DASH segment items for a single view experience.

In DASH, periods and segments can be reconstituted such that changes in timings are recorded prior to being requested locally or via HTTP, cached, and rendered. Because DASH does not restrict segment length, longer segments allow for better compression and larger GOP structures, along with less HTTP overhead. In contrast, shorter segments are used for live content and can be accessed quicker in highly variable bandwidth situations, with shorter GOP structures, but introduce more overhead and less efficient compression. They enable faster switching between segments, and thus more flexible bitrate management. These differences can be accounted for, among many, in how XLINKS and streams are stored and managed in memory. For example, for a first broadcaster that uses a long GOP, the first broadcaster or other entity may define "Y" and "Z" in the above description of FIG. 3 to be different from (typically greater than) "Y" and "Z" for a second broadcaster that uses a shorter GOP. Each broadcaster can choose what its customary segment length is. The variation needs to be managed in memory when dealing with Multiview content from different sources and between online sources as well.

Figure 5:
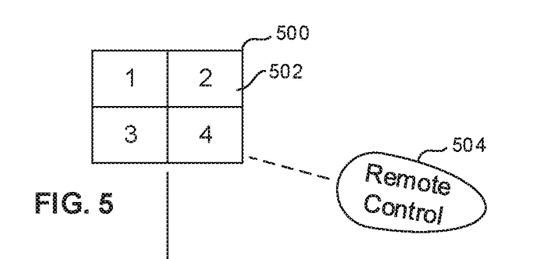
FIGS. 5 and 6 are screen shots a Multiview display changing template or channel.
Figure 6:
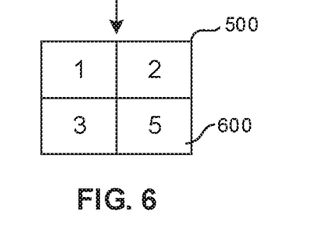
Figure 7:
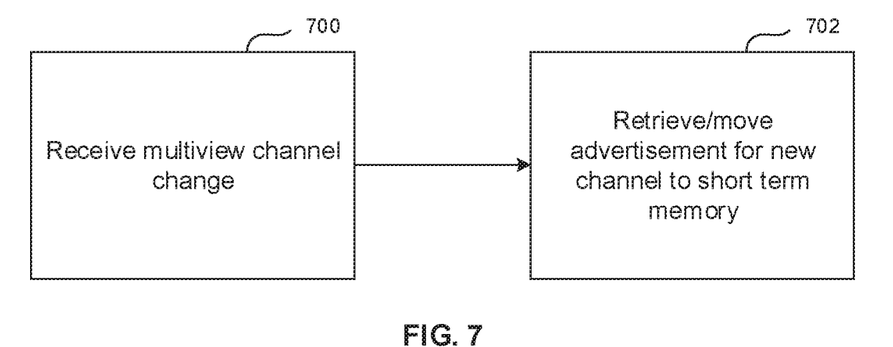
FIG. 7 a flow chart illustrating example logic consistent with FIGS. 5 and 6.

FIGS. 5-7 illustrate a Multiview use case in which a receiver display 500 presents four content windows 502 (labeled 1-4 in FIG. 5) that may be independently tuned to different content or a different template altogether using, e.g., a remote control (RC) 504. FIG. 6 illustrates an example in which the channel for content window 4 in FIG. 5 has been changed to content window 500 (labeled content 5) in FIG. 6.

FIG. 7 indicates at block 700 that the above-presented Multiview channel change command is received. Moving to block 702, in response to the channel change, the receiver may retrieve and/or move replacement content (and/or metadata pertaining thereto) for the new channel 5 from longer term memory to shorter term memory to ensure it is available now that the channel to which it pertains has been tuned to.

Figure 8:
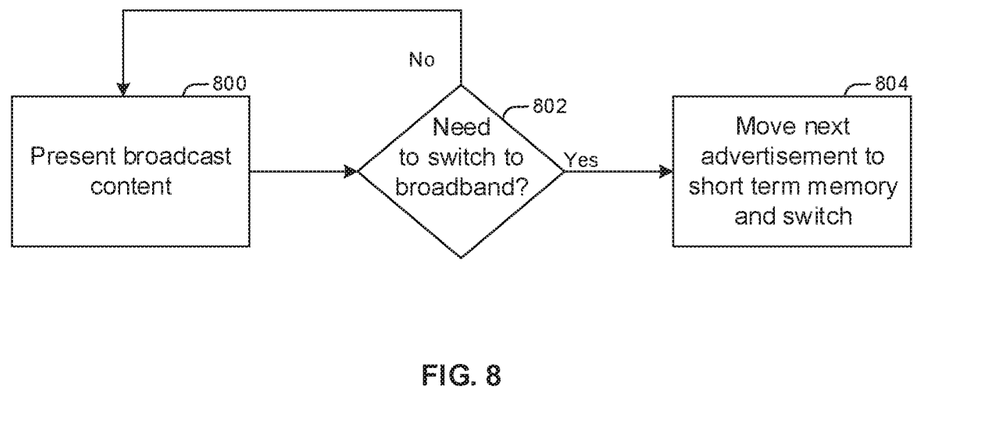
FIG. 8 a flow chart illustrating example logic consistent with present principles.

FIG. 8 illustrates a second edge case in which a receiver presents broadcast content at block 800. Owing to a variety of factors, decision diamond 802 indicates that a switch from receiving the content broadcast (OTA) to receiving the same content broadband (OTT) may be indicated or required, in which case the logic moves to block 804. At block 804, in response to the switch from broadcast to broadband, a next replacement content to be inserted into the stream and/or its metadata such as an associated Xlink (as indicated by, e.g., a DASH MPD file received prior to the decision at diamond 802) is moved to shorter term memory.

It will be appreciated that whilst present principals have been described with reference to some example embodiments, these are not intended to be limiting, and that various alternative arrangements may be used to implement the subject matter claimed herein.

What is claimed is:

1. A digital television system comprising:
   at least one receiver of digital television configured with instructions to:
   receive from at least one transmitter assembly comprising at least one broadcast source and at least one broadband source at least one extensible markup language linking language (Xlink) associated with inserting into digital TV content at least a first advertisement;
   successively stage the Xlink in successively faster memories of the receiver as advertisement insertion time approaches, the Xlink indicating at least one network location from whence the digital TV content can be accessed but not being the digital TV content;
   for a first channel comprising a first length for a group of pictures (GOP), move the Xlink from a first memory of the receiver to a second memory of the receiver at a first time prior to an insertion time; and for a second channel comprising a second length for a GOP, move the Xlink from the first memory of the receiver to the second memory of the receiver at a second time prior to an insertion time.

2. The digital television system of claim 1, comprising the transmitter assembly.

3. The digital television system of claim 1, wherein the digital television system comprises an advanced television systems committee (ATSC) 3.0 system.

4. The digital television system of claim 1, wherein the instructions are executable to:
  initially store the Xlink in flash memory of the receiver; and
  move the Xlink from flash memory to random access memory (RAM) of the receiver.

5. The digital television system of claim 4, wherein the instructions are executable to:
  move the Xlink from the RAM to synchronous dynamic RAM (SDRAM) of the receiver.

6. The digital television system of claim 5, wherein the instructions are executable to:
  move the Xlink from the SDRAM to a playout buffer of the receiver.

7. The digital television system of claim 1, wherein the first length is longer than the second length and the first time is earlier from the insertion time than the second time.

8. The digital television system of claim 1, wherein the instructions are executable to:
  receive a channel change in a Multiview presentation; and
  responsive to the channel change, move the Xlink from a first memory of the receiver to a second memory.

9. A digital television system comprising:
  at least one receiver comprising at least one processor programmed with instructions to configure the processor to:
  receive from at least one transmitter assembly at least a first service comprising at least one audio video (AV) stream;
  present the AV stream;
  the first service comprising a first group of pictures (GOP), the instructions being executable to move an extensible markup language linking language (Xlink) from a first memory of a receiver to a second memory of the receiver at a first time prior to an insertion time; and
  for a second service comprising a second GOP, move the Xlink from the first memory of the receiver to the second memory of the receiver at a second time prior to an insertion time.

10. The digital television system of claim 9, wherein the first service comprises a Multiview event.

11. The digital television system of claim 9, wherein the first service comprises switching receiving content via broadcast to receiving content via broadband.

12. The digital television of claim 9, wherein the instructions are executable to, responsive to a first event, move replacement content and/or metadata associated therewith from a first storage to a second storage of the receiver, wherein the second storage has a faster data access time than the first storage.

13. The digital television of claim 9, wherein the instructions are executable to:
  receive a channel change command to tune to the second service;
  retrieve from a broadcast or broadband source replacement content and/or metadata associated therewith and associated with the second service in response to the channel change command.

14. The digital television of claim 9, wherein the first GOP comprises a first length and the second GOP comprises a second length.

15. The digital television system of claim 9, comprising the transmitter assembly.

16. The digital television system of claim 9, wherein the digital television system comprises an advanced television systems committee (ATSC) 3.0 system.

17. In a digital television system, a method comprising:
  receiving from at least one transmitter assembly at least one replacement content to be inserted into an audio video (AV) stream and/or metadata associated therewith; and
  successively staging the replacement content to be inserted into the AV stream and/or metadata associated therewith in successively faster memories of a receiver as insertion time into the AV stream of the replacement content approaches;
  wherein at least a first parameter associated with the successively staging is defined at least in part by a first broadcaster based on a group of pictures (GOP) from the first broadcaster defining a first length, the first parameter associated with the successively staging being defined at least in part by a second broadcaster based on a GOP from the second broadcaster defining a second length different from the first length, the method comprising moving an extensible markup language linking language (Xlink) from a first memory of the receiver to a second memory of the receiver at a first time prior to an insertion time.

18. The method of claim 17, wherein the digital television system comprises an advanced television systems committee (ATSC) 3.0 system.

19. The method of claim 17, wherein the metadata comprises at least one extensible markup language linking language (Xlink).

* * * * *